Figure 1:
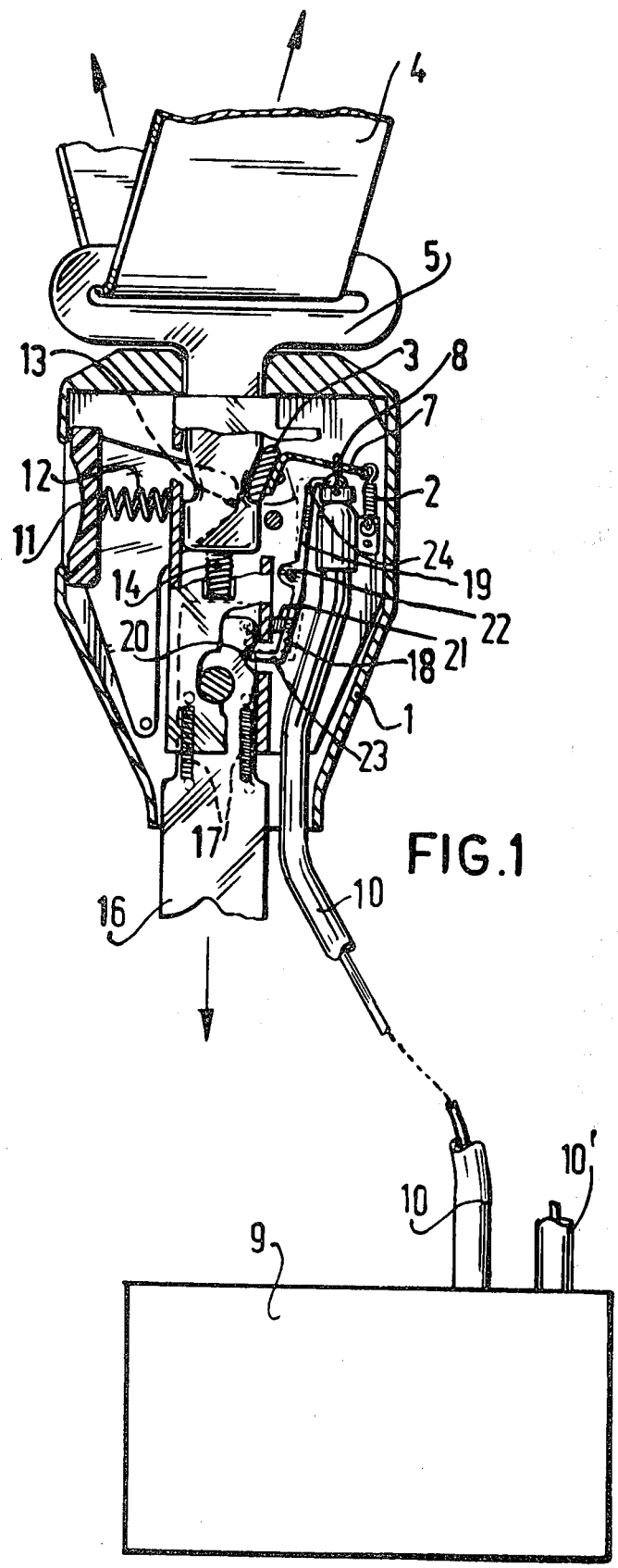

United States Patent [19]

Lassche

[11] 4,413,384

[45] Nov. 8, 1983

[54] LOCKING DEVICE FOR A SAFETY BELT

[76] Inventor: Jakob Lassche, 45, Wiesenwegle, 7230-Schramberg, Fed. Rep. of Germany

[21] Appl. No.: 247,541

[22] PCT Filed: Jul. 29, 1980

[86] PCT No.: PCT/NL80/00025
§ 371 Date: Apr. 2, 1981
§ 102(e) Date: Mar. 18, 1981

[87] PCT Pub. No.: WO81/00383
PCT Pub. Date: Feb. 19, 1981

[30] Foreign Application Priority Data

Feb. 8, 1979 [NL] Netherlands .................. 7905948

[51] Int. Cl.³ .............................................. A44B 19/00
[52] U.S. Cl. .......................................... 24/603; 24/645
[58] Field of Search ........ 24/230 A, 230 AT, 203 SB, 24/205.14, 205.15, 223, 230 AL, 230 AK, 230 R

[56] References Cited

U.S. PATENT DOCUMENTS 4,126,919  11/1978  Lassche ............................ 24/230 A
4,162,715  7/1979   Coulombe ......................... 24/230 A

FOREIGN PATENT DOCUMENTS 2369949  6/1978  France ............................. 24/230 R Primary Examiner—Robert P. Swiatek
Assistant Examiner—James Hakomaki
Attorney, Agent, or Firm—Diller, Ramik & Wight

[57] ABSTRACT

A locking device for a safety belt comprising a housing, a spring-loaded lock bolt movable in the housing, a key that can be inserted into the housing and having at least one recess fitting to the lock bolt, an unlocking mechanism, an output element of which engages, upon energization, a control-member of the lock bolt, which is moved out of the recess against the spring force and a blocking mechanism for the output element, with the blocking mechanism comprising a fastening element movable against spring force with respect to the housing, with the fastening element in its rest position releasing the path of the output element and in the displaced position blocking the path.

4 Claims, 3 Drawing Figures

LOCKING DEVICE FOR A SAFETY BELT

The invention relates to a locking device for a safety belt comprising a housing, a spring-loaded lock bolt displaceable in said housing, a key that can be inserted into the housing and has at least one recess fitting the lock bolt, an unlocking mechanism, an output element of which engages upon actuation a control-member of the lock bolt and moving said lock bolt against the spring load out of the recess and a blocking mechanism for the output element. Such a locking device is known from Pat. Appl. 7212304, in which the blocking mechanism is formed by the lock bolt and the recess in the key itself. When a tensile force is exerted on the belt and hence on the key, the friction between the lock bolt and the key may increase to an extent such that the effort transferred by a compression spring for unlocking is not sufficient. Since this friction is dependent upon the surface conditions of the lock bolt, of the key and upon the presence of foreign substances, if any, on the contacting surfaces, the effort at which blocking occurs is not reproducible. The invention has for its object inter alia to avoid this disadvantage and provides a locking device of the kind set forth, which is characterized in that the blocking mechanism is provided with a fastening element for the housing which is movable against spring load with respect to the housing, said fastening element in the rest position releasing the path of the output element and blocking said path in the displaced state. With this construction the path of the output element is blocked after a given displacement of the fastening element corresponding to a given tensile force exerted on the key.

By a suitable choice of the spring load of the fastening element the limit value of the effort at which blocking occurs can be adjusted.

In a very suitable embodiment the fastening element cooperates with a spring-loaded lever, one of the two parts mentioned being provided with a lug bearing on a face of the other part which is inclined to the direction of movement of the fastening element, said lever in the drawn-out position of the fastening element extending by a protuberance into the path of the output element and not extending into it in the rest position of the fastening element. This very simple construction permits of arranging the required parts in a small space. Moreover, with such a construction a relatively small displacement between the fastening element and the housing of the locking device will suffice. It is advisable to arrange the lever rotatably on a shaft extending transversely of the direction of displacement of the fastening element.

Figure 2:
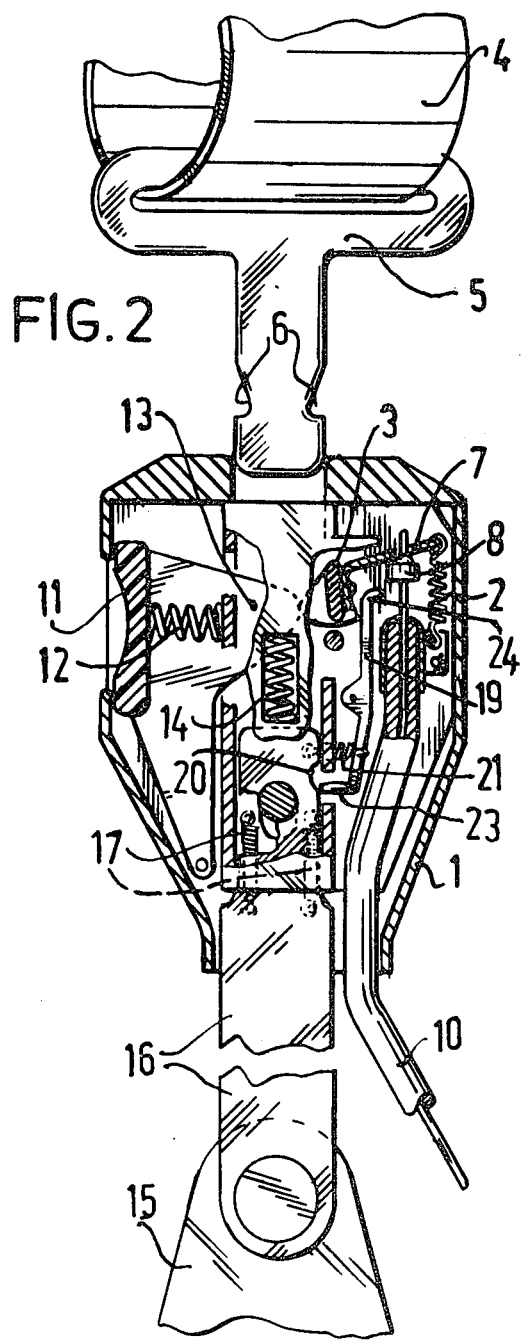
Figure 3:
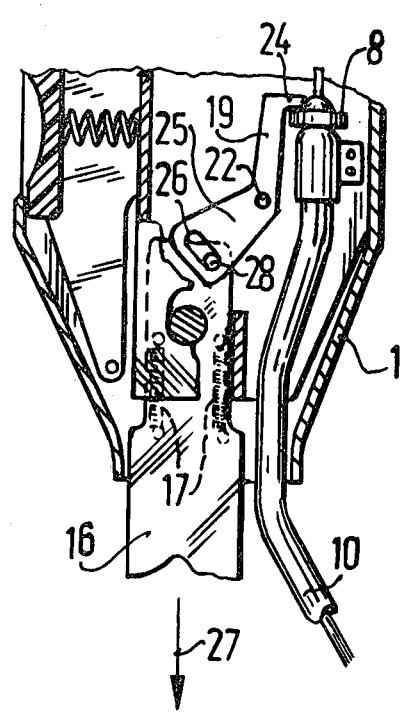

The invention will be described more fully with reference to the drawing, in which FIG. 1 is an exploded view of the locking device in accordance with the invention in the state in which a tensile force is exerted on the key, FIG. 2 shows the locking device of FIG. 1 in the state in which no tensile force is exerted on the key and the unlocking mechanism is energized and FIG. 3 shows a detail of a variant of the locking device in accordance with the invention.

FIGS. 1 and 2 show a preferred embodiment of a locking device according to the invention, which comprises a housing 1, a lock bolt 3 movable in said housing and loaded by a spring 2 and a key 5 connected with a safety belt 4 and having on both sides recesses 6 one of which is adapted to receive the lock bolt 3 dependent upon the orientation of the key upon insertion. The lock bolt 3 is coupled with a control-member 7 formed by an arm, which is engaged by the output element 8 of an unlocking mechanism indicated schematically by 9. The unlocking mechanism 9 is connected by means of a flexible tie element 10 with the output element 8.

The locking device can be manually operated by means of a knob 11, which can be pressed inwardly against the effort of a compression spring 12 so that the lug 13 connected with the knob 11 pushes the lock bolt out of the recess 6, after which the key 5 can be removed out of the housing. When the key 5 is introduced into the housing 1, the lock bolt 3 is pushed aside until it snaps into the recess 6 under the action of the spring 2. When the key 5 is inserted into the housing 1, a compression spring 14 is compressed.

The housing is fastened to the chassis 15 of a vehicle with the aid of a fastening element 16, which is slidably journalled in the housing 1. When the element 16 is drawn outwardly, the tensile springs 17 are stretched as is indicated in FIG. 1. On the fastening element 16 is bearing a lug 23 on the arm 18 of a spring-loaded lever, the other arm 19 of which is located near the output element 8. When the fastening element 16 is drawn out, the recess 20 moves to a position opposite the lug 23 on the arm 18 of the lever so that the latter tilts about the shaft 22 under the action of the spring 21 and a hook-like extension 24 connected with the arm 19 gets in front of the output element 8 and prevents the latter from moving towards the control-element 7 of the lock bolt 3. In this manner it is avoided that when a tractive force is exerted on the belt 4 and hence on the key 5, the locking device is opened under the action of the energization of the unlocking mechanism 9.

The unlocking mechanism 9 may be used for unlocking various locking devices, for which purpose several flexible tie members 10, 10' may be connected with said unlocking mechanism.

FIG. 3 shows a detail of a modified embodiment of the locking device according to the invention. In the housing 1 a fastening element 16 is again slidably journalled against the effort of tensile springs 17 as in the embodiment shown FIGS. 1 and 2. The output element 8 and the lever arm 19 adapted to turn about the shaft 22 and having the extension 24 are also designed in the manner shown in FIGS. 1. and 2. On the contrary, the second lever arm 25 has an elongated hole 26 inclined to the direction of movement of the fastening element 16 indicated by the arrow 27. This elongated hole holds a pin 28 provided on the fastening element 16 so that by moving the fastening element 16 with respect to the housing 1 the lever 19, 25 performs a turn.

What is claimed is:

1. A locking device for a safety belt comprising a housing, a fastening member having a portion disposed in said housing for limited movement between retracted and extended positions with respect thereto, first spring means for urging said housing and fastening member to said retracted position, a lock bolt received in said housing for limited movement between locking and unlocking positions relative thereto, second spring means for urging said lock bolt toward said locking position, a key receivable in said housing and having a recess receiving said lock bolt in the locking position of the latter to prevent withdrawal of the key from said housing, means for effecting remote actuation of said lock bolt from said locking position toward said unlocking position whereby said key may be withdrawn from said housing, and blocking means operative when said fastening member and housing are in said extended position for blocking said means for effecting remote actuation and operative when said fastening member and housing are in said retracted position for unblocking said means for effecting remote actuation.

2. A locking device as claimed in claim 1 wherein said blocking means includes a lug and a spring causing said lug to bear upon the fastening member, said fastening member having a recess allowing said lug to ride thereinto when said fastening member and housing are in said extended position, said lever also having a protuberance movable into and out of blocking position relative to said first means.

3. A locking device as claimed in claim 2 characterized in that the lever is rotatable about a shaft transversely of the direction of displacement of the fastening element.

4. A locking device as defined in claim 1 including release means carried by said housing for actuating said lock bolt to said unlocking position.

* * * * *